(12) United States Patent
Gibbs

(10) Patent No.: US 10,506,798 B2
(45) Date of Patent: Dec. 17, 2019

(54) ANIMAL NUTRITION SYSTEM AND METHOD

(71) Applicant: Andy H. Gibbs, Tucson, AZ (US)

(72) Inventor: Andy H. Gibbs, Tucson, AZ (US)

( * ) Notice: Subject to any disclaimer, the term of this patent is extended or adjusted under 35 U.S.C. 154(b) by 131 days.

(21) Appl. No.: 15/901,870

(22) Filed: Feb. 21, 2018

(65) Prior Publication Data
US 2018/0235183 A1    Aug. 23, 2018

Related U.S. Application Data

(60) Provisional application No. 62/461,283, filed on Feb. 21, 2017.

(51) Int. Cl.
| | |
|---|---|
| *A01K 5/01* | (2006.01) |
| *A01K 29/00* | (2006.01) |
| *A23K 50/42* | (2016.01) |
| *G08B 21/18* | (2006.01) |
| *A01K 7/00* | (2006.01) |
| *A01K 11/00* | (2006.01) |
| *A01K 5/02* | (2006.01) |

(52) U.S. Cl.
CPC .......... *A01K 29/005* (2013.01); *A01K 5/0114* (2013.01); *A01K 5/0121* (2013.01); *A01K 5/02* (2013.01); *A01K 7/00* (2013.01); *A01K 11/006* (2013.01); *A23K 50/42* (2016.05); *G08B 21/182* (2013.01)

(58) Field of Classification Search
CPC .. A01K 29/005; A01K 5/0114; A01K 5/0121; A01K 11/006; A01K 5/0283; A01K 5/01
See application file for complete search history.

(56) References Cited

U.S. PATENT DOCUMENTS

| | | | |
|---|---|---|---|
| 4,617,876 A * | 10/1986 | Hayes | A01K 1/0023 |
| | | | 119/51.02 |
| 6,311,644 B1 | 11/2001 | Pugh | |
| 6,868,804 B1 | 3/2005 | Huisma | |
| 7,380,518 B2 | 6/2008 | Kates | |
| 8,627,786 B2 | 1/2014 | Arthur | |
| 8,930,148 B2 | 1/2015 | Huisma | |
| 9,149,022 B2 | 10/2015 | Triener | |
| 10,091,972 B1 | 10/2018 | Jensen | |
| 2008/0314335 A1 | 12/2008 | Kates | |
| 2010/0263596 A1 | 10/2010 | Schumann | |

(Continued)

FOREIGN PATENT DOCUMENTS

GB    2475583 A    5/2011

*Primary Examiner* — Monica L Williams
(74) *Attorney, Agent, or Firm* — Neustel Law Offices

(57) ABSTRACT

An animal nutrition system and method for effectively monitoring and managing animal nutrition. The animal nutrition system and method generally includes a food container storing a volume of pet food, a package identification chip attached to the food container, a food serving appliance configured to removably receive the food container, and a scale positioned within the food serving appliance to weigh the food container periodically to generate weight data. The food serving appliance includes a chip reader that communicates with the package identification chip to receive food container data from the package identification chip to acquire data related to the food package.

20 Claims, 13 Drawing Sheets

(56) References Cited

U.S. PATENT DOCUMENTS

| | | | |
|---|---|---|---|
| 2012/0199076 A1* | 8/2012 | Biede | A01K 5/0114 119/51.02 |
| 2012/0299731 A1 | 11/2012 | Triener | |
| 2012/0325156 A1 | 12/2012 | Abramson | |
| 2016/0012748 A1 | 1/2016 | Donavon | |
| 2016/0192620 A1* | 7/2016 | Hu | A01K 5/0114 119/51.02 |

* cited by examiner

| ILLUSTRATIVE DATA ON RFID / NFC CHIP |
|---|
| a. Tare Weight Upper Tray |
| b. Tare Weight Lower Tray |
| d. Topper Net Weight and Moisture (If Topper) |
| e. Food Gross Weight |
| f. Food Solid Net Weight or Percent of Food |
| g. Food Moisture (water) Net Weight or percent of food |

400 — 1) PREPARE A MEAL: OPEN CONTAINER, ADD WATER

|  | Weight (gm) | Water Vol (ml) |
|---|---|---|
| Food Tray Tare Weight * | 100 | |
| Water Tray Tare Weight * | 85 | |
| Food Water (20% of 190gm) * | 38 | 38 |
| Food Solids (80% of 190 gm) * | 152 | |
| Water added (weighed & converted) | 177 | 177 |
| Total Gross Weight / Vol (weighed & converted) | 552 | 215 |
| | | |
| _COMPUTE NET WEIGHTS BEFORE MEAL STARTS_ | | |
| Net Weight Food (Solids and Water) and Added Water | 367 | |
| Net Of All Water | 215 | 215 |

401 — 2) AFTER MEAL: WEIGH & RECORD ACTUAL, THEN REMOVE FOOD TRAY, FILL WATER TRAY

| | | |
|---|---|---|
| A. Food Tray Tare Weight * | 100 | |
| B. Water Tray Tare Weight * | 85 | |
| C. Food Water (20% of 190gm) (verify food consumed) | 0 | 0 |
| D. Food Solid (80% of 190 gm) (verify food is consumed) | 0 | |
| E. Water Remaining (computed based on ending weight) | 35 | 35 |
| F. Total Ending Gross Weight | 365 | 35 |
| | | |
| G. Net Water Consumed _Add Water Volume To Cumulative Daily Log_ | | 180 |
| | | |
| H. Start Food Moisture | 38 | |
| I. Start added Water | 177 | |
| J. Total Start Water | 215 | |
| | | |
| K. Remaining Water | 35 | |
| L. Consumed Water During Meal | 180 | 180 |

402 — 3) DAILY WATER

|  | Weight (gm) | Water Vol (ml) |
|---|---|---|
| M. Food Tray Tare Weight (Removed & Discarded) | 0 | |
| N. Water Tray Tare Weight * | 85 | |
| O. Water added (weighed & converted to ml) | 600 | 600 |
| P. Total Gross Weight / Vol (weighed & converted) | 685 | 685 |
| | | |
| Q. Before next meal, weigh, take the difference between start and end weight, compute water consumed. _Add Water Volume To Pet's Cumulative Daily Log_ | | |

403 — 4) NEXT DAY: SCALES ZEROED & DAILY PET LOG CLOSED WHEN WATER TRAY IS REMOVED AND DISCARDED, REPEAT STEP (1) ABOVE THAT STARTS NEW DAY ON THE PET LOG

Note: * = Known data is wirelessly communicated from a chip on food package to a device.

| ILLUSTRATIVE DATA ON RFID / NFC CHIPS |
|---|
| a. Tare Weight Food Container |
| b. Tare Weight Water Container |
| d. Food Nutritional Content by Weight (Multi-meal Pack) |

404 — 1) NEW MEAL PREPARATION

| Prepare Food | Weight (gm) | Water (ml) |
|---|---|---|
| (Tf) Food Tray Tare Weight * | Tf | |
| (Gf) Add Food until Feedback * | Gf | |
| (NfW) Food Water (20% of Gf) * | Gf X 20% | gm to ml |
| (NfS) Food Solids (80% of Gf) * | Gf X 20% | |
| (W1) Gross Weight | W1 | |
| Added Water | W1-Tf-Nf | gm to ml |

| COMPUTE WATER AT START OF MEAL | | |
|---|---|---|
| (NfW) Food Water (20% of Gf) * | Gf X 20% | gm to ml |
| Net Added Water | W1-Tf-Nf | gm to ml |
| Subtotal Water 1 | (Gf X 20%)+(W1-Tf-Nf) | gm to ml |

| WATER AT END OF MEAL - AT TRAY REMOVAL | | |
|---|---|---|
| (W2) Gross Ending Weight | W2 | |
| Tf * | 100 | |
| NW1 Net Ending Water (No Tray) | NW1 | gm to ml |

| ALL WATER DURING MEAL | | |
|---|---|---|
| Subtotal Water 1 | (Gf X 20%)+(W1-Tf-Nf) | gm to ml |
| (less) NW1 Net Ending Water (No Tray) | NW1 | gm to ml |
| 405 — Subtotal Water 2 | ((Gf X 20%)+(W1-Tf-Nf))-NW1 | gm to ml |

406 — 2) AFTER MEAL: LARGE WATER CONTAINER

| | | |
|---|---|---|
| W3 Starting Gross Weight | W3 | |
| Tw Water Tray Tare Weight * | Tw | |
| NW2 Net Starting Water (No Tray) | W2-Tw | gm to ml |

| IF REFILLED | | |
|---|---|---|
| W5 Gross Weight After Fill | W5 | |
| W4 Gross Weight Before Fill | W4 | |
| NW3 Net Added Water | W5-W4 | gm to ml |

| WATER FROM WATER TRAY - AT TRAY REMOVAL | | |
|---|---|---|
| NW2 Net Starting Water (No Tray) | W2-Tw | gm to ml |
| NW3 Net Added Water | W5-W4 | gm to ml |
| Total Added to Tray | (w2-Tw)+(W5-W4) | gm to ml |

| | | |
|---|---|---|
| W6 Current Gross Weight | W6 | |
| NW4 Net Ending Water (No Tray) | W6-Tw | gm to ml |
| 407 — Subtotal Water 3 | ((w2-Tw)+(W5-W4))-(W6-Tw) | gm to ml |

408 — 3) WATER FROM NON-METERED SOURCES (COLLAR)

| | | |
|---|---|---|
| Drink Signature Duration (Hour:Min:Sec) | 0:02:41 | |
| Consumption Rate (unique) 0.68ml/sec | 109.48 | 109 ml |

409 —

| 4) TOTAL DAILY CONSUMED WATER | W5-W4 | gm to ml |
|---|---|---|
| Subtotal Water 2 | ((Gf X 20%)+(W1-Tf-Nf))-NW1 | gm to ml |
| Subtotal Water 3 | ((w2-Tw)+(W5-W4))-(W6-Tw) | gm to ml |
| Signature-based Consumption | 109.48 | 109 ml |
| Total Consumption | gm | gm to ml |

ANIMAL NUTRITION SYSTEM AND METHOD

CROSS REFERENCE TO RELATED APPLICATIONS

I hereby claim benefit under Title 35, United States Code, Section 119(e) of U.S. provisional patent application Ser. No. 62/461,283 filed Feb. 21, 2017. The 62/461,283 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to an animal nutrition system and method for effectively monitoring and managing animal nutrition.

Related Art

Any discussion of the related art throughout the specification should in no way be considered as an admission that such related art is widely known or forms part of common general knowledge in the field.

More than half of companion dogs and cats that live in the 80 million US households are obese or overweight. Obese pets die up to 2½ years earlier, and can cost owners up to $7,000 more over the pet's lifetime when compared to properly nourished pets.

Pet health is closely tied to daily food and water consumption and activity levels. Unfortunately, most pet owners lack the knowledge, skills or aptitude to manage their pet's total nutrition and health. But even knowledgeable pet owners lack a convenient means to persistently monitor and manage their pet's daily health throughout the pet's lifetime as evidenced by persistently rising pet obesity rates. Consequently, when a health problem does occur, an owner is unable to provide the veterinarian with a reliable first diagnostic tool: a precise food, water and activity record.

The poor state of the pet nutrition management can be summarized as:

a) Pet food is typically packaged in large "bulk" bags or boxes that contain enough food for many portions or servings. Repeatedly opening poorly sealed pet food bags expose food to air which immediately starts the oxidation process that destroys nutrients.

b) Pet food manufacturers recommend roughly calculated meal portion measurements for animals they have never examined, heavily based on an owner's best guess of their pet's weight. At best, these recommendations are unreliable for managing pet nutrition, as evidenced by pet obesity rates.

c) Automated feeders fail to support nutrition management; they rely on food manufacturer's portion recommendations (which fail), and inaccurately assume a consistent weight or volume of dispensed food, and do not directly account for nutrient content (calories of same food volume can vary over 100 percent between two food brands).

d) Emerging "smart bowl" products record the amount of food consumed as a retrospective data point, but fail to prospectively correct forward-looking nutritional requirements. They fail to gather daily water consumption volume, data which is critical to comprehensive pet nutrition and health monitoring.

SUMMARY

The various embodiments disclose various systems and methods of managing total pet nutrition, and the first solution that encompasses the broad industry segments pet food manufacturing, in-home IoT connected feeding devices, pet health monitoring, and historical pet data output for veterinary care.

The various embodiments may include food manufacturing methods and food packaging products, and feeding devices in communication with a wireless network providing for: the precise portioning and packaging of complete and balanced meals individualized for each unique pet; the collection, recording and analysis of retrospective data related to total daily food and water consumed by the pet from all sources; the perpetual data analysis to identify anomalies and correlate anomalies to potential health problems; a method of communicating the normal and anomalous data to pet owners and/or veterinarians; and for prospective modification of pet nutritional requirements and adjustment to the meal portioning throughout the lifetime of each uniquely identified pet.

Therefore, pet owners desiring to save thousands in pet hospital bills by raising healthier pets will immediately appreciate the economic and convenience value of a food delivery system of the various embodiments herein that first provides the most accurately portioned, complete and balanced meals individualized for their pets, and a system that perpetually monitors, records and analyzes all daily food and water consumption and pet activity for the life of the pet.

It is important to have access to the pet's complete and detailed lifetime nutritional, caloric and water consumption records as a first go-to diagnostic tool when pet health problems do occur.

There has thus been outlined, rather broadly, some of the embodiments of the animal nutrition system and method in order that the detailed description thereof may be better understood, and in order that the present contribution to the art may be better appreciated. There are additional embodiments of the animal nutrition system and method that will be described hereinafter and that will form the subject matter of the claims appended hereto. In this respect, before explaining at least one embodiment of the animal nutrition system and method in detail, it is to be understood that the animal nutrition system and method is not limited in its application to the details of construction or to the arrangements of the components set forth in the following description or illustrated in the drawings. The animal nutrition system and method is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 7 is an exemplary diagram illustrating a chart of one set of processes and correspondingly triggered mathematical computations representative of software algorithms used to manage a pet's nutrition and health in accordance with an example embodiment.

FIG. 12 is an exemplary diagram illustrating a chart of one set of processes and triggered mathematical computations representative of software algorithms used to manage a pet's nutrition and health in accordance with an example embodiment.

DETAILED DESCRIPTION

Feeding System Using Single-Portion Disposable Food Packaging

Figure 1:
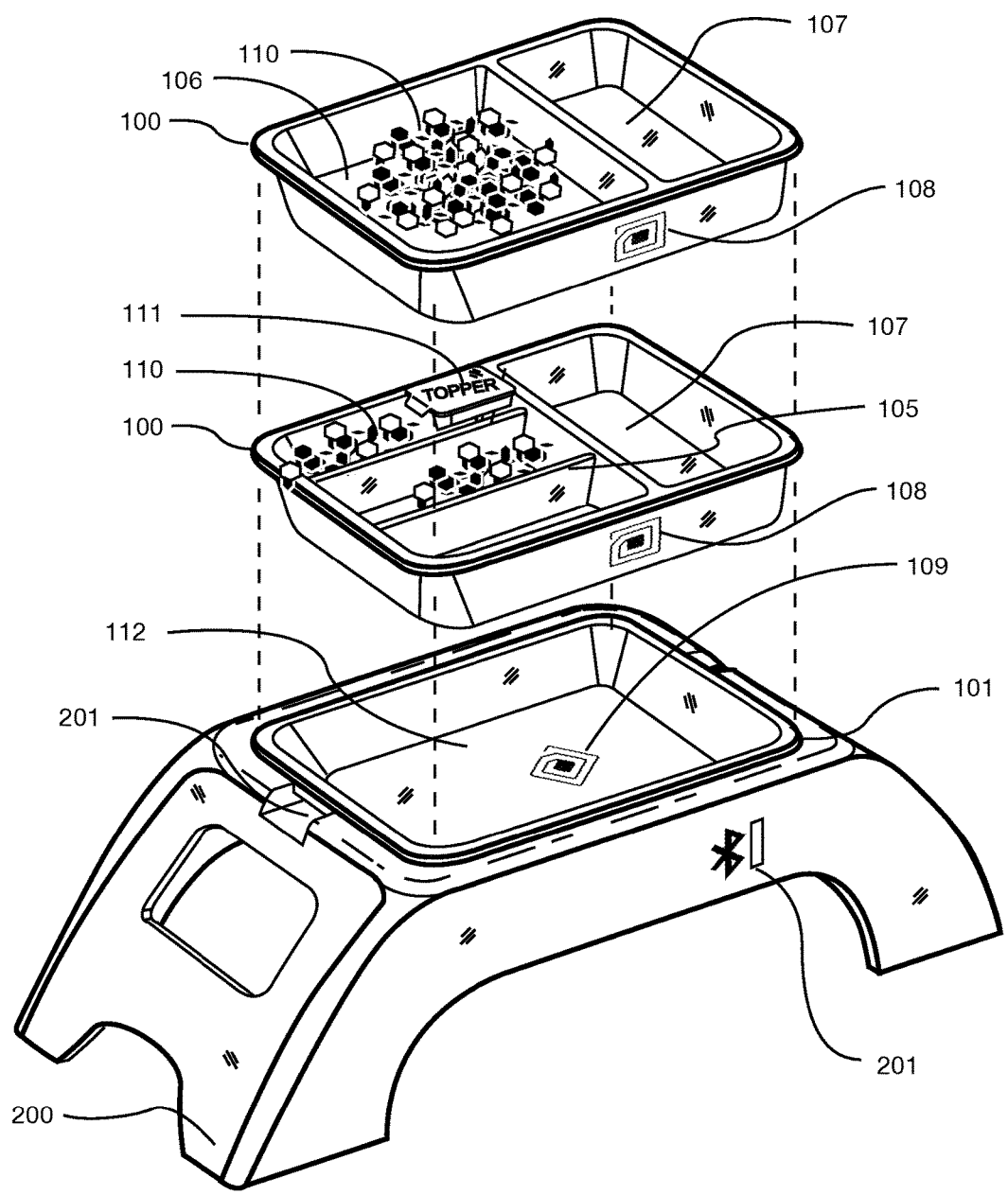
FIG. 1 is an exploded perspective view an animal nutrition system and method in accordance with an example embodiment.

FIG. 1 is an exemplary diagram illustrating an isometric view of a wireless pet feeding system comprising a wireless food serving appliance 200 and interchangeable food and water containers. The appliance may communicate with various wireless devices via a Bluetooth 201 connection, WIFI, or other low-power wireless communications protocols.

The wireless food serving appliance provides for a communication module not shown, but which reads, stores and transmits data provided on various food and water package identification chips 108, 109 that will be more fully described below.

In the various embodiments herein, various disposable food containers 100 are shown with a food compartment 106 having been prefilled with pet food 110 by the food manufacturer, a meal water compartment 107, the food and water compartments being separated by a compartment separator 105. As can be seen, two variations of food and water compartment configurations are show, but are not meant to be limiting. Any configuration that provides for a food and water section may be used so long as the food compartment is of a sufficient volume to hold one meal portion of food.

Although it is preferable to a pet to have water available during the consumption of food, replacing the food container with a water container may suffice in some instances. Therefore, a manufactured, pre-filled food container without a water compartment may be used in place of the multi-compartment food container provided that the food container is replaced by a water container immediately after the pet consumes the single portion of food in the food container.

Those skilled in the art will immediately appreciate the pet nutrition and health advantages of pet foods packaged in single-serving, complete portion food containers compared to traditional pet food packaging that contains more than one meal portion, including:

a) the precise measurement of a complete and balanced portion that is most appropriate for each individualized pet prevents over or under feeding the pet;

b) limiting exposure to air for the few minutes before feeding the pet prevents food quality breakdown. It is well known that oxidation of food in a bulk package begins immediately after the bag is opened and exposed to air. Even re-closing the bag for storage after removing one meal portion does not prevent oxygen from breaking down food nutrients that continues to lower food quality until the bulk bag is emptied;

c) unmatched hygiene. Since a new food container is used as the food bowl for each meal, there are no residual food particles, bacteria, mold or other pathogens that are typically found on food bowls that are not cleaned immediately after the pet finishes its meal.

In the drawing, a manufacturer's food identification chip 108 is shown affixed to the versions of the disposable single-serving food containers, the chip being a low power communication device such as Bluetooth, Ant, ZigBee, Near Field Communication (NFC), or employing any other low power wireless protocol for the purpose of transmitting to a proximate wireless device and/or reader certain data related to the food container.

In the various embodiments herein, certain data related to the known food content is preferably provided for on the chip, the data being: the portion weight of the food; the moisture content expressed in a specific measure of water or as a percentage of food weight; energy content of the food expressed in kcal; the net weight of the food absent water; and the tare weight of the food container without a cover.

Other data may be included on and transmittable by the chip communication module including but not limited to: place and date of production; lot number; use-by date; UPC number; gross weight of the food container and related packaging; ingredient list and amounts; nutritional value of food components; and source of food components.

Further, the chip may contain a unique identification code that correlates to a specific animal identification, for instance, "a package of beef flavored, non-grain pet food containing 458 kcal that is intended to be consumed by customer's pet ID Number XXXX". In multi-pet households, or in households where a particular pet had been put on a medically restricted diet by a veterinarian, it is preferable that prior to, or at the time of feeding, the particular food package is verified to be consistent with the food portion size and ingredients of the intended animal. Therefore, a direct or indirect communication link between the pet and the food upon a network authenticates the match between the intended pet and the present food container.

In the event that an inappropriate food container is being presented to a pet for consumption, various notifications to the pet owner will be actuated preferably including one of any of a visual indicator such as a flashing light on the appliance, a text message to a smartphone, and audible alarm.

Optionally, a separately manufactured and sealed food enhancing flavor topper 111 may be provided within the sealed single portion food container 100, the topper being a well known product type that is opened and poured onto food to increase palatability. If an optional flavor topper is incorporated into the food container, then the food container identification chip 108 just described will also include data regarding the topper including the total weight, tare weight, net weight of the liquid topper, water content in liquid measure, and other relevant manufacturing information.

The system of the various embodiments herein that authenticates the pet-to-food match is further useful in the event of a food recall for various reasons, the recall notice applied to certain data on various chips affixed to food containers triggering an alarm warning notification as just described.

In the drawing, a large disposable water container 101 is shown in a docked position within the serving appliance 200, and water container comprising a large water compartment 112 and a water container identification chip 109, the chip containing at least the tare weight of the container.

For convenience of removing a food or water container from the docked position in the serving appliance 200, one or more appropriately positioned container removal finger slots 201 are provided. Although not shown, projecting features may be formed into the food and/or water container perimeter top rim that allows for easy grasping for removal.

In the present configuration just described, the food container 100 and water container 101 are intended for disposal after use.

Figure 2:
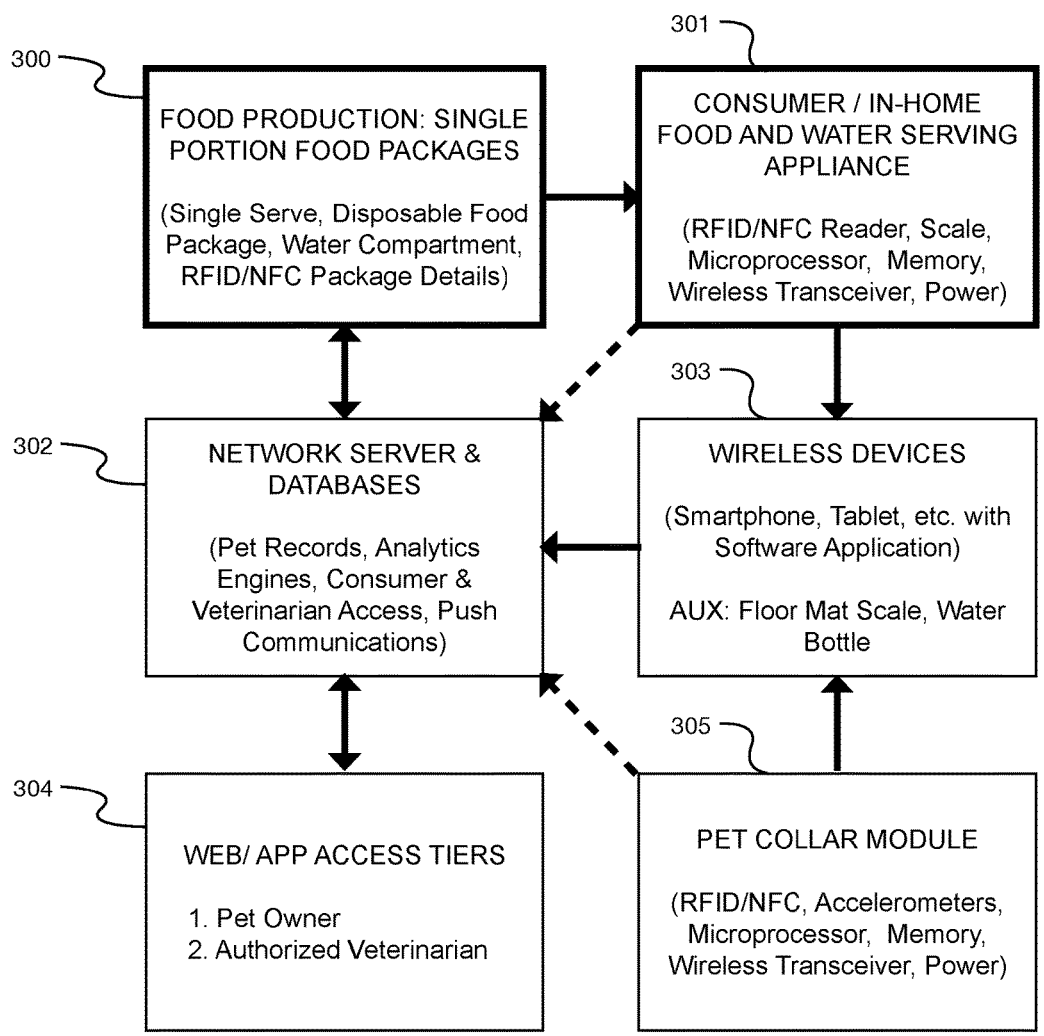
FIG. 2 is an exemplary block diagram illustrating major components of a pet nutrition and health management system in accordance with an example embodiment.

FIG. 2 is an exemplary block diagram illustrating major components of a pet nutrition and health management system. In the various embodiments herein, a plurality of products and technologies interact as a means to preferably monitor, collect, process, send, store and analyze data related to pet food and water consumption.

In the drawing a single portion food package is manufactured 300 at a pet food manufacturing facility, the pet food nutritional and caloric content being of certain measurements so as to constitute one meal portion preferably for one specifically identified animal or a plurality of animals of substantially similar physiological characteristics.

Prior to manufacturing, the food manufacturer 300 received pet characteristics and corresponding daily food requirements from a networked server 302, the server being further networked to a manufactured wireless food serving appliance 301 preferably located in the pet's domicile, at least one networked wireless device 303 operable by the pet's owner or custodian and/or located in the pet's domicile, pet wearable devices such as a pet collar 305 providing for data collection related to activity and water consumption, and a portal providing third party data access 304, preferably via a WEB application, for querying and/or retrieving pet history information by the pet's owner or veterinarian.

In some instances it may be preferable for the serving appliance and pet wearable devices 301, 305 to be in direct communication with the network, the devices having unique identifications that correlate to the unique identification of the pet for which they are collecting data. On the other hand, it may be preferable for the serving appliance and/or pet wearable devices 301, 305 to be in direct communication with a pet owner's wireless device, for instance, a smartphone, that received data from various in-home and pet wearable devices, federated the data, and further communicates the data to the network. The various embodiments herein is not intended to limit access protocol or sequence of any device upon the network so long as all of the preferred data related to the pet, its activity, food and water consumption are communicated, preferably at approximately 24 hour intervals, to the pet's personally identifiable record stored on the server.

In-home wireless devices 303 preferably comprise interactive communication devices such as smartphones or tablets, but may also include auxiliary data collection devices such as a wireless floor scale for weighing the pet, additional metered water sources, or metered water bottles.

Figure 3:
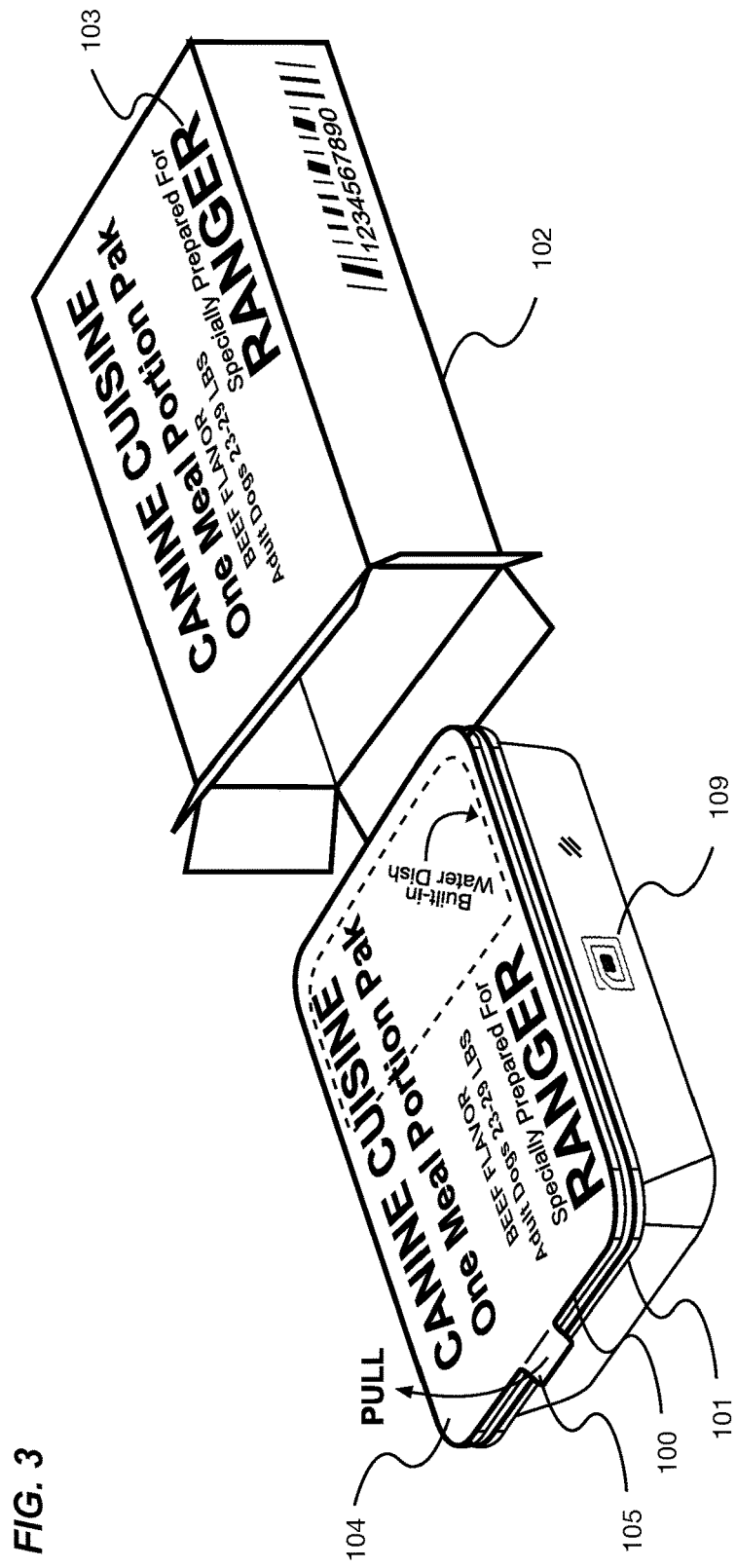
FIG. 3 is an exemplary diagram illustrating an isometric view of a single portion disposable pet food package in accordance with an example embodiment.

FIG. 3 is an exemplary diagram illustrating an isometric view of a single portion pet food package. In one variation of a single portion package, a disposable prefilled food container 100 is nested within a disposable water container 101 of interior dimensions larger than the exterior dimensions of the food container to provide for nesting. In the drawing, an opening pull tab 105 is shown on the sealed food container closure 104 as one convenient method of opening the food container for serving.

A water container identification chip 109 is shown affixed to the exterior of a water container 101, and as previously described but not shown, a food container identification chip is affixed to the food container 100. It should be noted that the location or method of adjoining the container chips with the containers is not meant to be limiting, and the chips may be adhesively affixed, integrally incorporated into the container material, and may be preferably located on the exterior or interior of the containers.

A single portion outer package 102 is shown of a traditional stock paper design of appropriate weight as one optional means of maintaining the nesting of the food and water containers just described, and to further provide a more convenient, rectilinear outer package that preferably packs efficiently into a larger box for shipping multiple meals in a single outer package. However, the nested food and water containers may be shrink wrapped and sealed for more durable air-tight closure of the food package. The body of art related to food packaging and over-packaging is broad, and the various embodiments herein does not limit the specific method of packaging and over-packing to the food and water container packaging as described herein.

It is preferable that a pet owner is able to easily identify the correct food for their pet or pets. In a multi-pet household with pets of different sizes, ages, activity levels and such, it is important to feed the pet-specific portion to the correct pet.

The various embodiments may include, but do not require, the uniquely identifying each pet portion by applying a customer label 103 on the single portion outer package 102 and/or on the exterior of the nested food and water packages 101, 102.

Further, a food container identification chip 109 may provide data to a smartphone or to the wireless food serving device that identified the individual pet for which the food is intended.

Figure 4A:
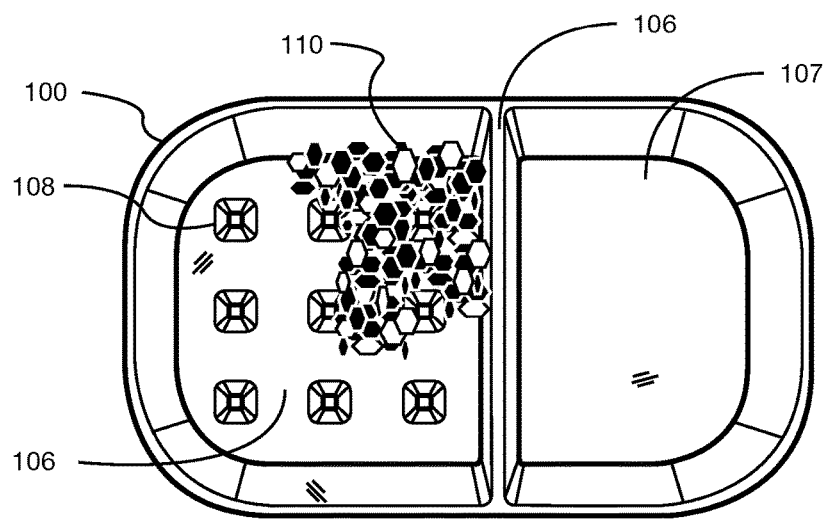
FIG. 4A is an exemplary diagram illustrating a top view of a food tray of a single portion pet food package filled with food in accordance with an example embodiment.

FIG. 4A is an exemplary diagram illustrating a top view of a food tray of a single serve pet food container 100. In the drawing, a food compartment 106 and a meal water compartment 107 are shown on opposed sides of a compartment separator 105. During the manufacturing process, the food compartment 106 has been filled with the precise amount of food 110 required for a single portion for the intended pet.

Those skilled in the art understand that a pet that rapidly eats food may experience a life-threatening stomach condition commonly referred to as "bloat". One method of reducing the probability of a pet experiencing bloat is to slow down the rate of food consumption, and provide immediately available water to drink during mealtime. In the drawing, a plurality of interior castellations 108 project upward from the bottom of the food compartment 106, the size, number and arrangement of the castellations being a function of the size and type of food filled into the compartment. Castellations require the pet to work around structural impediments to reach the full portion of their food, and in doing so, inherently slow the rate of consumption.

Figure 4B:
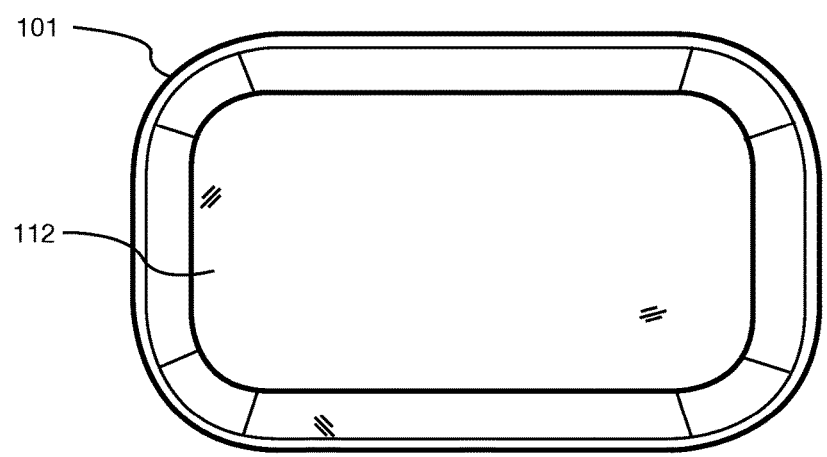
FIG. 4B is an exemplary diagram illustrating a top view of a water tray of a single portion pet food package in accordance with an example embodiment.

FIG. 4B is an exemplary diagram illustrating a top view of a disposable water container 101 of a single serve pet food package, the container comprising the largest possible water compartment 112, preferably of a dimension substantially large enough for the disposable food container FIG. 4A to fit within for nesting.

Figures 4C, 4D:
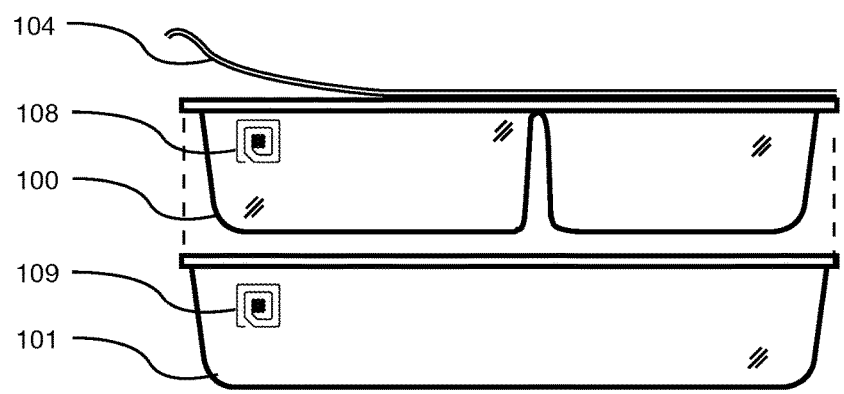
FIG. 4C is an exemplary diagram illustrating a side view of a nestable food and water tray of a single portion pet food package in accordance with an example embodiment.
FIG. 4D is an exemplary diagram illustrating a chart listing partial information recorded on a readable chip on a pet food package in accordance with an example embodiment.

FIG. 4C is an exemplary diagram illustrating a side view of a nestable food and water tray of a single serve pet food package. More specifically, a disposable water container 101 as just described is shown positioned beneath a disposable food container 100 into which food is filled prior to sealing with a food container closure 104. As previously described, food container and water container identification chips 108, 109 are incorporated into the food and water containers respectively, the chips containing transmittable data related to the containers.

FIG. 4D is an exemplary diagram illustrating a chart listing partial information recorded on a readable chip on a pet food package. A food chip data chart 306 lists information related to a disposable single portion food package preferably listing the tare weight of the food container, tare weight of the water container, the net weight and characteristics of a topper food if included in the package, the gross weight of the food filled into the food container, the net weight or percentage of the solid food, and the water volume in the food expressed in volume and/or weight, or a moisture percentage of the food gross weight.

These data are unique to the various embodiments herein and provide reliable baseline data, a component of the total data used to compute each pet's actual daily food and water consumption.

Figure 5:
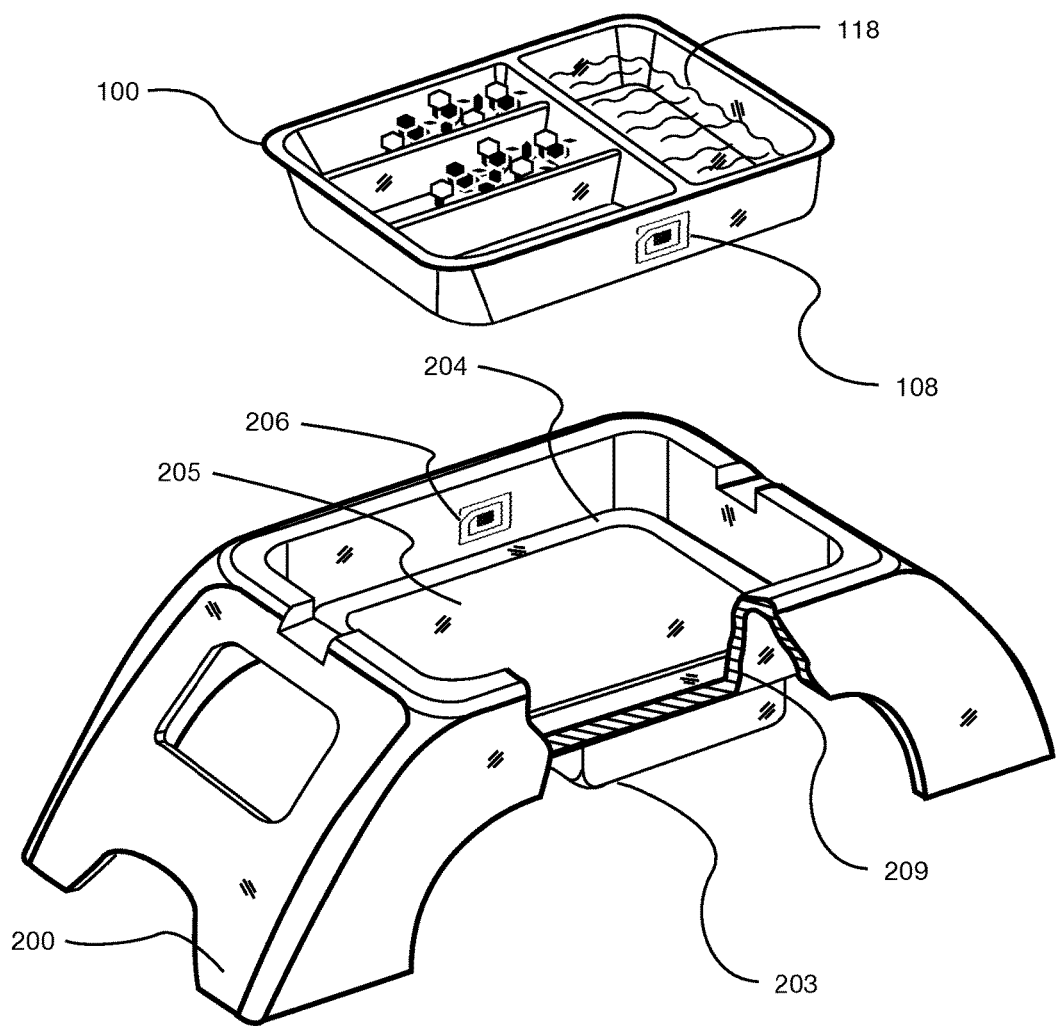
FIG. 5 is an exemplary diagram illustrating isometric view of a single portion pet food package and wireless food serving appliance in accordance with an example embodiment.

FIG. 5 is an exemplary diagram illustrating isometric view of a single serve pet food package and wireless food serving appliance. The drawing shows a disposable food container 100 with food distributed in a plurality of food compartments, and water 118 shown partially filling the water compartment, the single portion food package thereby being in a condition ready to server to the pet.

A food container docking berth 204, shown as a cavity structure of a dimensional width, length and depth substantially sufficient to accommodate the insertion and secured retention of a food container with food and water.

A single weighing mechanism, such as a scale 205 is shown in such a position as to provide for weighing of a disposable container filled only with food, a disposable container filled only with water, or a disposable container filled with food and water. The type of scale is not meant to be limiting, and any type of scale providing for high resolution digital output may be used. The scale is in communication with an electronics module 203 partially visible on the underside of the appliance because part of the wall section 209 of the appliance has been cut away to allow for viewing the module, the module providing for, among other functions, the collection of weight data, time of data collection, storage of the data, receiving data from food and water container identification chip reader 206, and power source.

Figure 6:
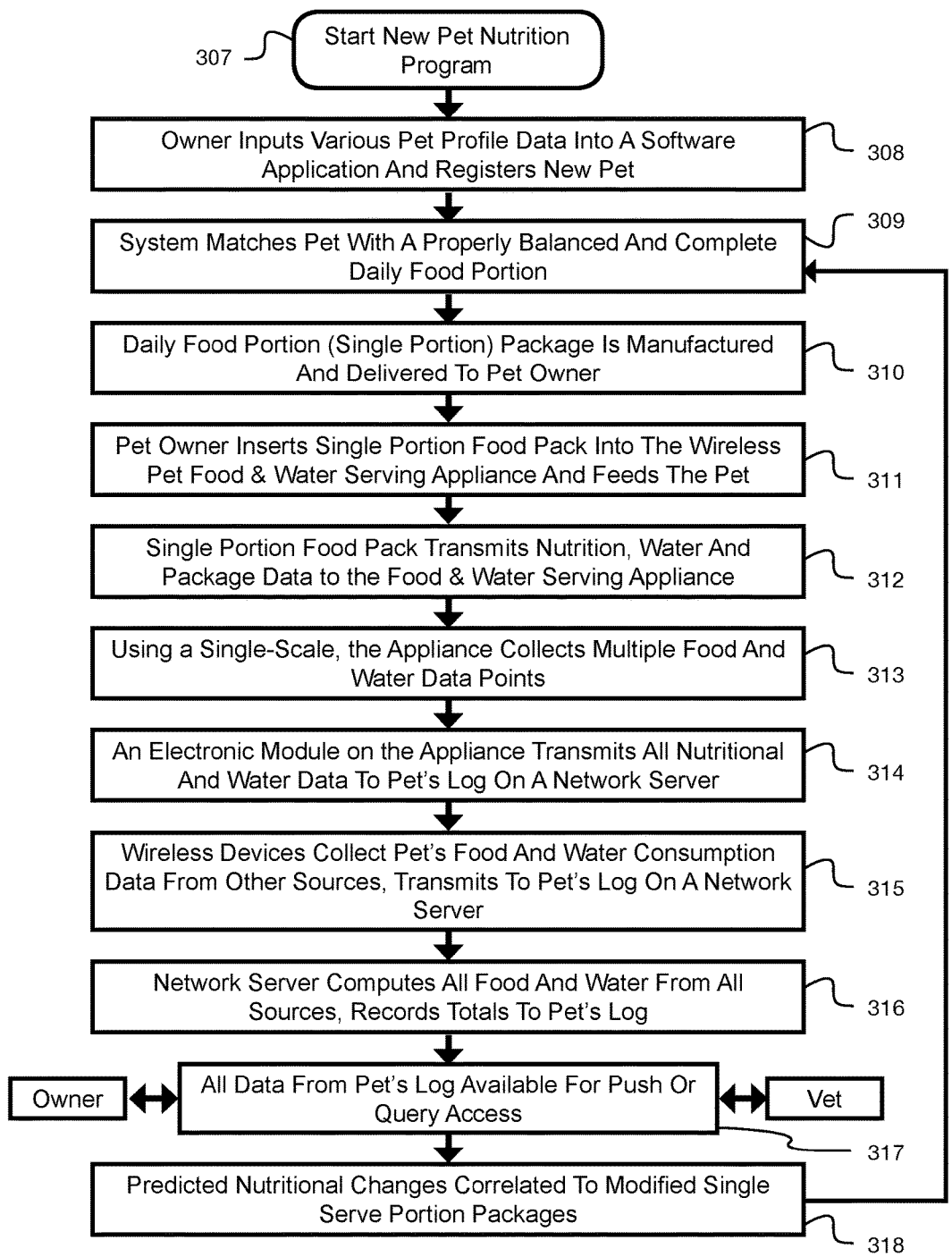
FIG. 6 is an exemplary diagram illustrating a flow chart of a preferred sequence of managing a pet's nutrition and health in accordance with an example embodiment.

FIG. 6 is an exemplary diagram illustrating a flow chart of a preferred sequence of managing a pet's nutrition and health. A pet owner puts a new pet on a nutrition program 307 by first examining and entering into a server a new pet profile 308 using common physiological characteristics. Based on the owner-input data, the server analysis determines a proper meal portion 309.

A food manufacturer produces a single portion food package 310 consistent with the preferred portion and nutritional requirements of the pet. Upon receiving delivery of the single portion food package an owner opens the manufactured food package, adds water into the water compartment, and places the meal package into a wireless feeding appliance 312. The appliance collects information contained on the food package identification chip as previously described, and begins to collect weight data from the scale and electronics module of the appliance 313.

By communicating directly with a server on the network, or indirectly via a mobile wireless device, the appliance preferably transmits all of the collected data just described to the individual pet's profile record on the server 314.

It is well known that a pet consumes food and water throughout the day from sources other than the meal-time pet food appliance, and other from traditional food and water bowls. For instance, a pet may receive mid-day treats, and drink water from a swimming pool. These data must be considered within the scope of a total nutrition monitoring program.

It should be clearly noted that absent the collection of these data, any nutrition or health monitoring program fails to collect, analyze or deliver a reliable pet health nutrition profile.

In the drawing, food and water consumption data from non-metered, non-monitored sources is collected using various wireless devices 315, such wireless devices preferably including a pet wearable device that directly or indirectly records water consumption, and mobile devices with prompts to a pet owner to enter food given to the pet outside of mealtime. These data are transmitted to a server on the network, and are correlated with a unique pet identification. These data are added to the pet's personalized log 316.

The pet's nutrition and health records may be accessed by a pet owner or veterinarian 317, preferably via push notifications to a wireless device, or via a WEB portal.

An analytics engine on the network server analyzed daily pet intake data, performs a comparative analysis of the current data to both historical data, and more importantly future predicted data, and automatically makes any food portion or nutrition adjustments to the pet's daily portions 318, and communicates that information back to the server accessible to a food manufacturer. The food manufacturer will appropriately modify the portion package 309 for delivery to the owner for feeding to the pet.

FIG. 7 is an exemplary diagram illustrating a chart of one set of processes and correspondingly triggered mathematical computations representative of software algorithms used to manage a pet's nutrition and health.

It should first be noted that one preferred element of the various embodiments herein is the use of the tare weight of a food container, a water container, and/or a combined food and water container. Commercially valuable benefits of tare weight data provide for more precise pet food and water consumption measurement, and substantially reduce the production cost of food and water measurement devices, thereby establishing a competitive advancement over older, traditional separate pet food and water measurement systems.

Now then, in the drawing, a representative example is provided to illustrate one algorithmic process of obtaining food and water weights during meal preparation 400.

Prior to a pet owner initiating any action related to feeding a pet a single portion meal, the tare weight food and water containers, and the accurate food weight are known as a component of the manufacturing process.

Without articulating every line item of the mathematical process shown, those skilled in the art will appreciate that if all weights are known in advance, with the exception of the weight of water that is added by the homeowner at pet mealtime, that the current weight less known weights will equal the precise measure of the water that has been added to the feeding bowl.

Therefore, the after-meal 401 analysis of the food and water actually consumed during the mealtime are equally calculable, incorporating into the calculus the originally known tare weights of any packaging that was incorporated into any after-meal weight measurements.

It must be mentioned that the moisture content of pet food shall be a calculable component to determining total daily water consumption by the pet. It is well known that canned pet food contains in excess of eighty percent water, while dry kibble food contains approximately eight percent water. Any chance in a pet's diet between canned and kibble food can dramatically change the amount of water being consumed. Since changes in water consumption by a pet, whether an increase or decrease, correlate positively as indicators of underlying medical problems, neglecting to calculate accurate water consumption carries the high probability that symptoms of medical problems can be masked until significant damage to the pet's health has occurred.

The first pet health monitoring system provides for analysis and recording of food moisture content in addition to clear water consumption can now be fully appreciated.

During any given day, a pet may consume substantially all of the water in a water bowl, and the water bowl may need to be refilled. Using the already known tare weight of a water container, and the measure of the starting water being known, a formula 402 may provide for the cumulative measure of water added by means of a sensor that recognizes an increase in weight, instantly recording the weight at the moment additional water is poured into the bowl, and storing that data to be added to the later calculations of total daily water consumption.

At a subsequent mealtime, preferably the following day, a new single portion food package will need to be prepared and served as just described above. At the moment that the old container or containers are removed from the wireless food serving appliance 403, the last available ending weight is recorded and transmitted directly or indirectly to the server as the final integer needed to complete the total calculation of food and water consumed from the wireless food and water serving appliance, the data thereby being logged into the pet's historical health and nutrition profile.

Figure 8:
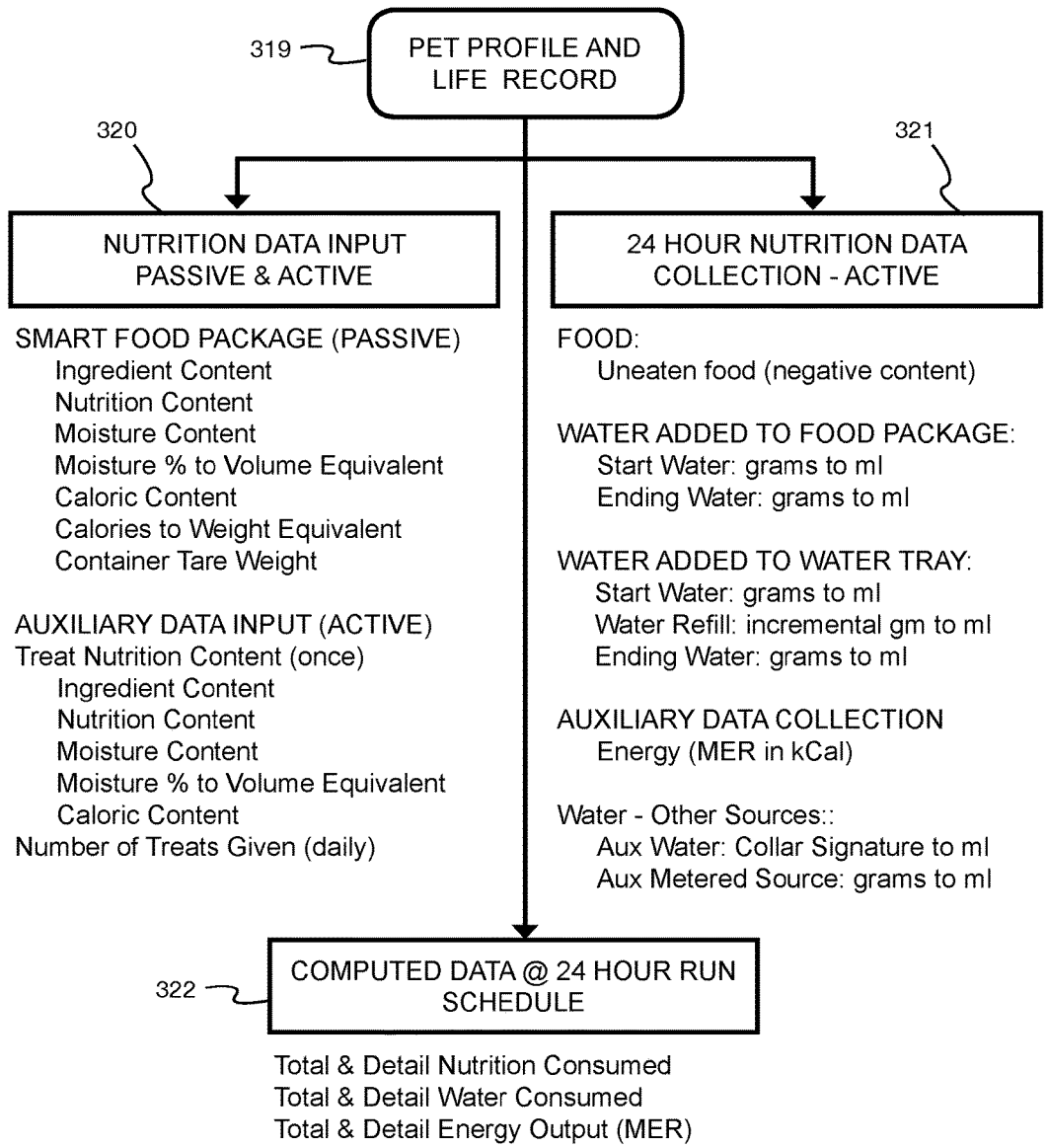
FIG. 8 is an exemplary diagram illustrating a block diagram showing sources of data in a pet nutrition and health management system in accordance with an example embodiment.

FIG. 8 is an exemplary diagram illustrating a block diagram showing sources of data in a pet nutrition and health management system.

As was previously mentioned, certain data related to food, moisture and tare weights are known, having been determined at the time the pet food was manufactured. The food ingredients and tare weights of a manufactured food package are recorded on a readable food package identification chip as described herein, the readable information being received by a wireless food serving appliance at the time that a food package is inserted into the appliance for serving to a pet.

Therefore, at the start of any daily analysis of pet food and water consumption, certain data is passively added to a pet's record on a server as nutritional data input 320, the word "passive" meaning that no active measurement by a pet food or water serving device is required. As can be readily seen in the drawing, a substantial amount of data initially recorded on the server before a pet is even proximate to the served meal. Active data collection preferably includes actions required by a pet owner such as the inputting of any treats given to the pet during the day outside of mealtime, and not included in the content of the food delivered via the food serving appliance. Further, the nutritional content of the treats will need to be input into the server one-time so that cumulative treat nutrition and moisture content can be included in daily food and water consumption computations.

Active measurements 321 preferably continue between the start of one mealtime, and the start of a subsequent mealtime, thereby providing a continual daily record of all food and water consumed by the pet within a repeatable time period. Active measurements by the various embodiments herein as shown in the drawing include all measurements taken by the wireless food serving appliance, as well as water consumption and energy expenditure in kcal units that are transmitted directly or indirectly from a pet wearable device to a network server, and relevant data received from any other wirelessly connected measurement device on the network.

One objective of the various embodiments herein therefore is to create and maintain daily food, water, nutrition and general health records for a pet, for every day throughout the pet's life time. A 24 hour schedule 322 is a reasonable time period for which to track daily pet data, the important elements of the daily data including but not limited to daily food and water consumed, and the underlying details thereof, and for pets with a wearable device for measuring activity, the total energy output of the pet during each recording period.

Feeding System with Reusable Trays and Multi-Portion Food Container

In some instances, it may be preferable to fill water and food into reusable food, food and water, or water containers usable in a wireless food serving appliance, the preferences being based on many factors that may include the temporary feeding of a veterinarian specified medical food not available in a manufactured single portion food package. Another non-limiting factor supporting the use of a variation of a wireless food serving appliance would be the use of food from packages that contained more than a single portion of food or, in other words, food that would be poured into the food container for a meal.

Figure 9A:
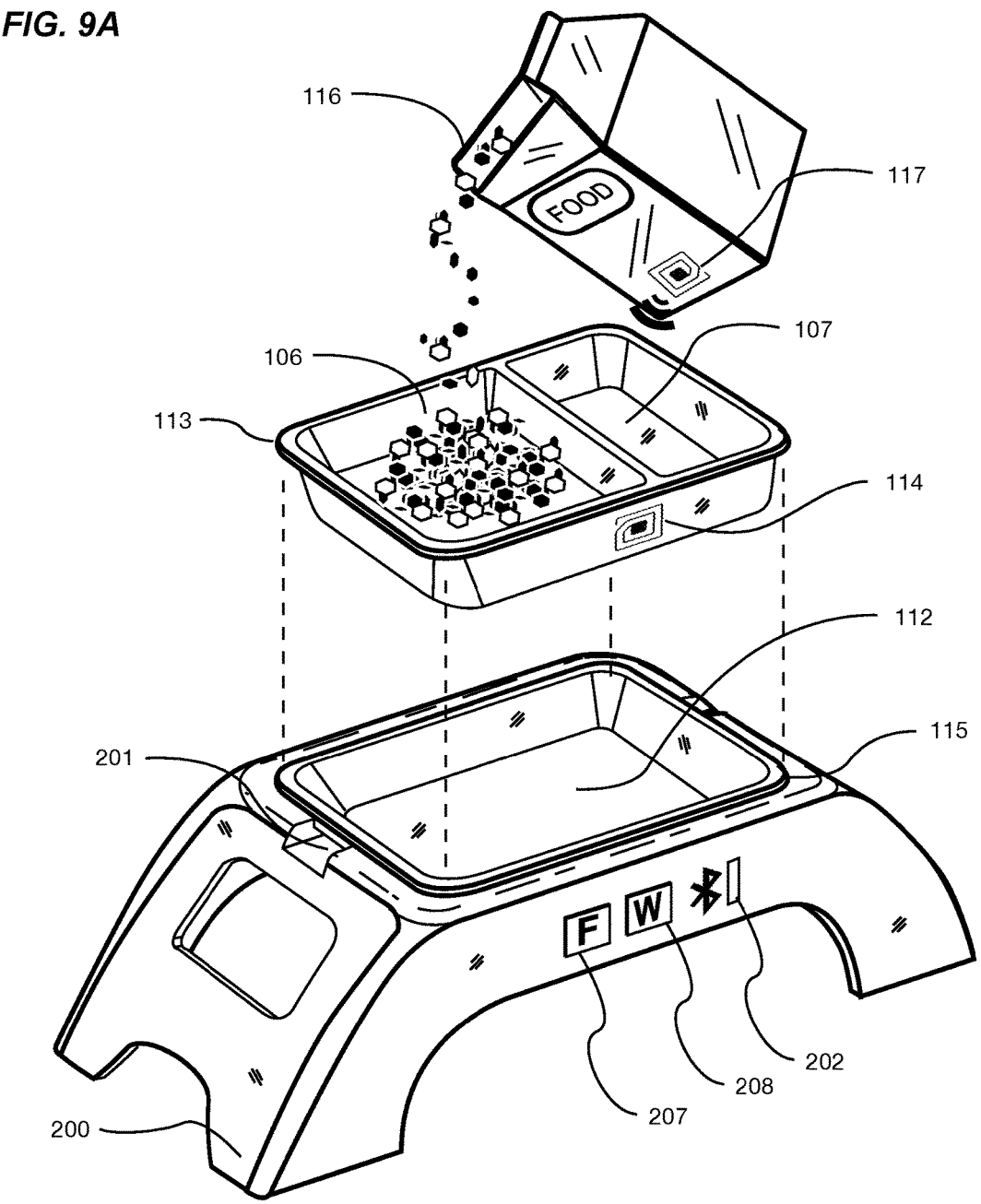
FIG. 9A is an exemplary diagram illustrating an isometric view of one variation of a wireless pet feeding system in accordance with an example embodiment.

FIG. 9A is an exemplary diagram illustrating an isometric view of one variation of a wireless pet feeding system comprising a wireless pet feeding appliance 200 substantially as previously described including a container removal finger slot 201, a Bluetooth connection indicator 202 and a weight sensing means and electronics module not shown but previously described FIG. 5.

Variations shown in the drawing include a food data reset button 207, and a water reset button 208, the reset buttons just described used to correlate the adding of food or water into the container with the pet's food or water consumption record. More specifically, the food reset button would be depressed when adding food, and the water reset button would be depressed when adding water. Further, the present variation provides for a reusable food container 113, and a reusable water container 114, the reusable food and water containers being of a known tare weight, and the tare weight being recorded on a reusable food container identification chip 114 and reusable water container identification chip not shown. The reusable food container 113 provides for a food compartment 106 and a water compartment 107, and the reusable water container provides for a large water compartment 112.

The reusable food and water containers may be nestable as previously described with the single-portion food and water containers, but nesting is not required for use independently.

A multi-meal food package 116 contains a sufficient volume of pet food to fill the food bowl with a single food portion each day for a plurality of days. The nutritional values of the food components, for instance, caloric content by weight, moisture content by weight or percentage of food weight, are known to the manufacturer of the food, and such data related to the nutrition details of the food are recorded on a readable multi-meal package identification chip 117, the chip being readable by a reader not shown, but previously described as an integral component of the wireless food serving appliance.

Figure 9B:
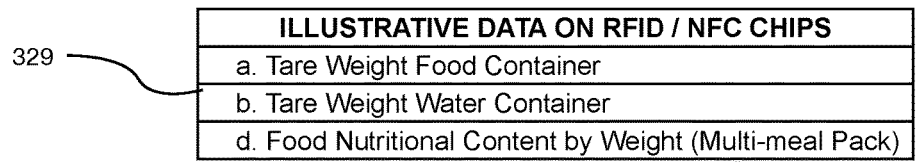
FIG. 9B is an exemplary diagram illustrating a chart listing partial information recorded on a wireless pet feeding appliance in accordance with an example embodiment.

FIG. 9B is an exemplary diagram illustrating a chart listing partial information recorded on a wireless pet feeding appliance. More specifically, a passive RFID data chart 329 lists the passive data passed by RFID chips to the wireless food serving appliance, and directly or indirectly to a network server.

The food nutritional content by weight information is used to determine the correct food portion for a particular pet, the mealtime caloric requirements being communicated from a network server to the electronics module of the wireless serving appliance not shown, but previously described, as a means of determining when the proper portion of food has been filled into the food compartment. When the known proper portion of food with a known nutrition content is poured into the bowl, a visual and/or audible indication is presented to the pet owner as an alert to stop pouring food into the food compartment.

Figure 10:
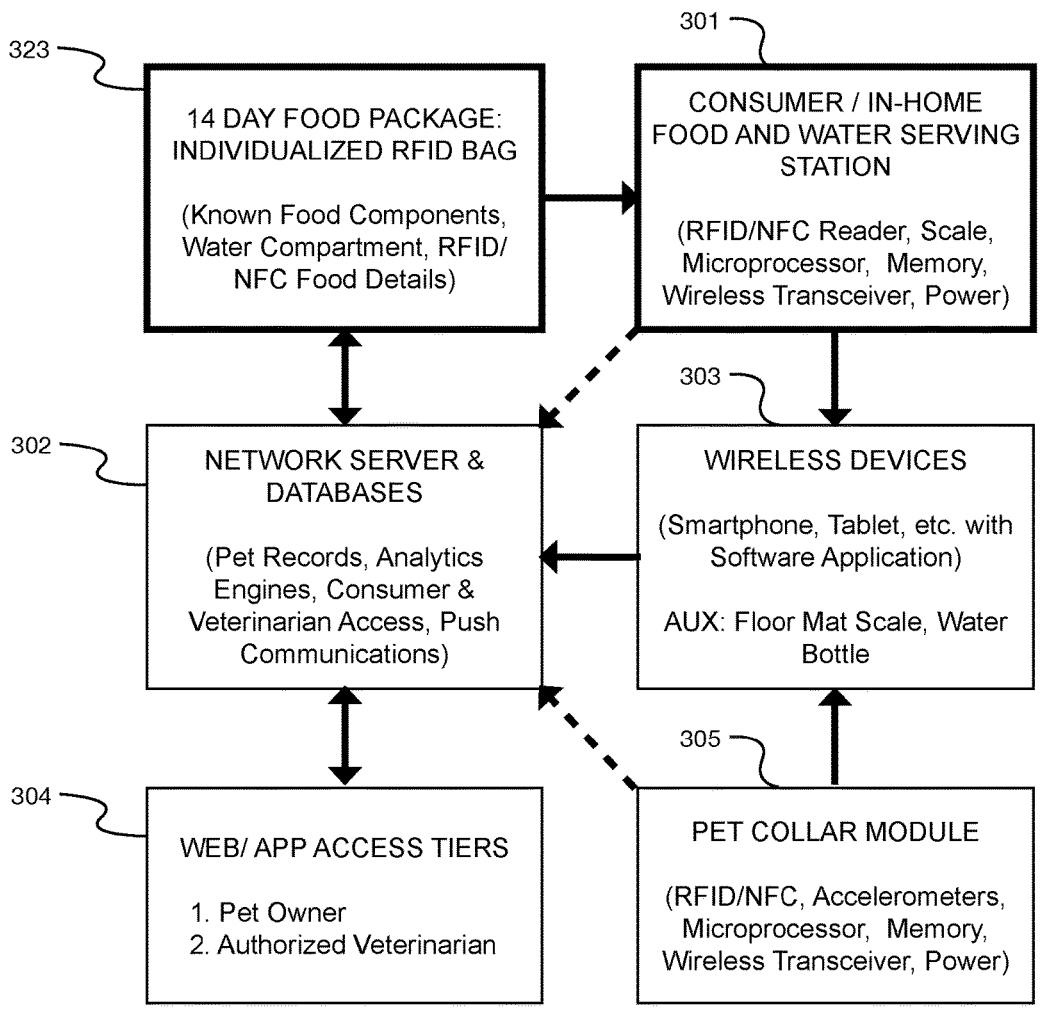
FIG. 10 is an exemplary block diagram illustrating major components of one variation of a pet nutrition and health management system in accordance with an example embodiment.

FIG. 10 is an exemplary block diagram illustrating major components of one variation of a pet nutrition and health management system. In the variation, a plurality of products and technologies interact as a means to preferably monitor, collect, process, send, store and analyze data related to pet food and water consumption.

In the drawing a food package that may be opened and closed multiple times is manufactured 323 at a pet food manufacturing facility, the nutritional and caloric content of the pet food being of certain measurements so as to constitute a predefined number of complete and balanced individual meal portions preferably for one specifically identified animal or a plurality of animals of substantially similar physiological characteristics.

Prior to manufacturing, the food manufacturer 323 received pet characteristics and corresponding daily food requirements from a networked server 302, the server being further networked to a manufactured wireless food serving appliance 301 preferably located in the pet's domicile, at least one networked wireless device 303 operable by the pet's owner or custodian and/or located in the pet's domicile, pet wearable devices such as a pet collar 305 providing for data collection related to activity and water consumption, and a portal providing third party data access 304, preferably via a WEB application, for querying and/or retrieving pet history information by the pet's owner or veterinarian.

In some instances it may be preferable for the serving appliance and pet wearable devices 301, 305 to be in direct communication with the network, the devices having unique identifications that correlate to the unique identification of the pet for which they are collecting data. On the other hand, it may be preferable for the serving appliance and/or pet wearable devices 301, 305 to be in direct communication with a pet owner's wireless device, for instance, a smartphone, that received data from various in-home and pet wearable devices, federated the data, and further communicates the data to the network. The various embodiments herein is not intended to limit access protocol or sequence of any device upon the network so long as all of the preferred data related to the pet, its activity, food and water consumption are communicated, preferably at approximately 24 hour intervals, to the pet's personally identifiable record stored on the server.

In-home wireless devices 303 preferably comprise interactive communication devices such as smartphones or tablets, but may also include auxiliary data collection devices such as a wireless floor scale for weighing the pet, additional metered water sources, or metered water bottles.

Figure 11:
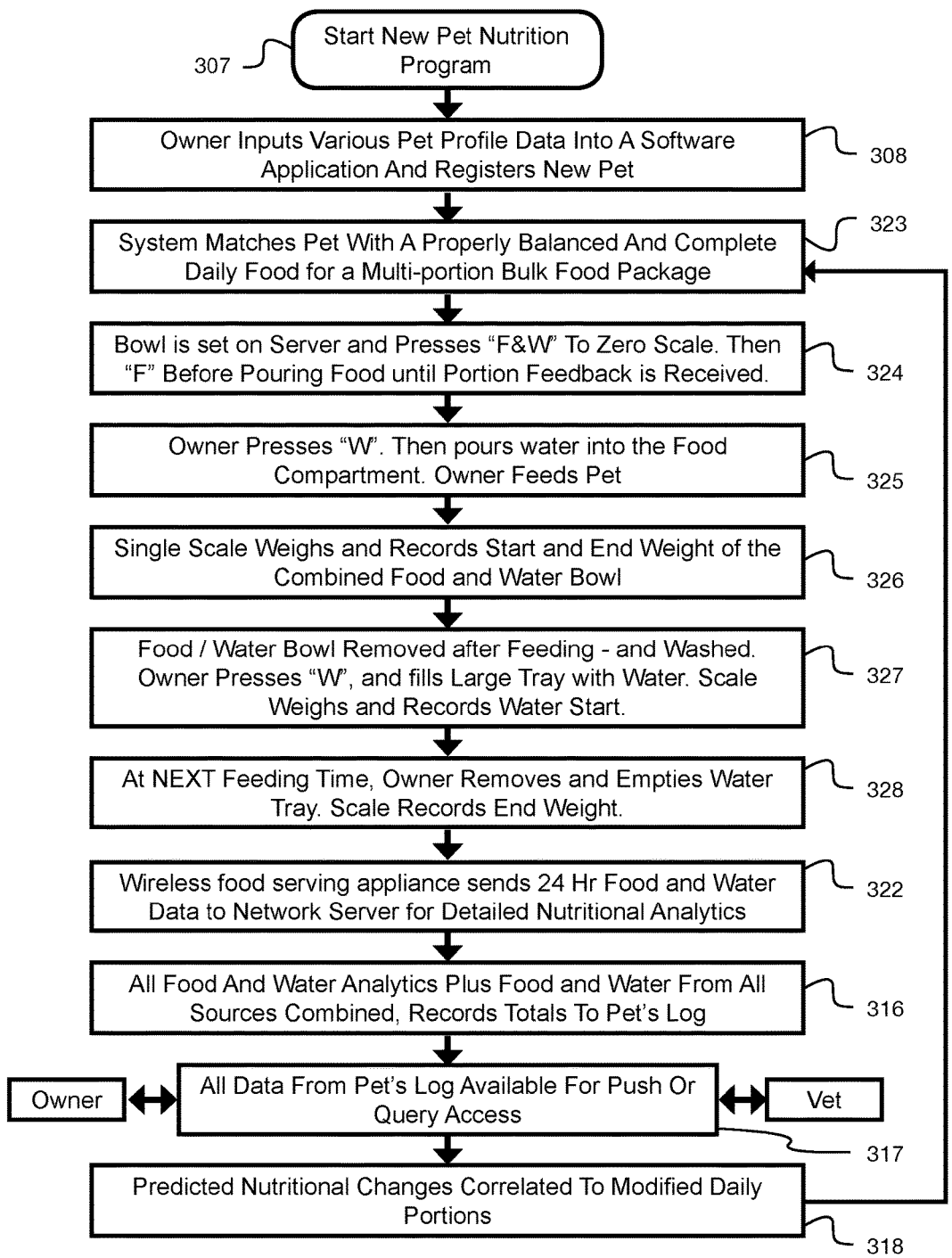
FIG. 11 is an exemplary diagram illustrating a flow chart of a preferred sequence of managing a pet's nutrition and health in accordance with an example embodiment.

FIG. 11 is an exemplary diagram illustrating a flow chart of a preferred sequence of managing a pet's nutrition and health.

A pet owner puts a new pet on a nutrition program 307 by first examining and entering into a server a new pet profile 308 using commonly used physiological characteristics. Based on the owner-input data, the server analysis determines a proper meal portion, and multiplies that by the number of meals that will be filled into a re-closable multi-portion bulk package 323.

Upon receiving delivery of the multi-portion food package, a pet owner prepares the wireless food serving appliance for a new meal by placing the reusable food container on the appliance, resetting the scale for food, then opening and transferring food from the multi-portion food package to the food compartment 324.

The owner then prepares to add water 325 by pressing the water button on the appliance to zero the water data, then adds water into the water compartment.

The appliance then records the food and water data 327 prior to the start of the meal.

After the pet completes the meal, the reusable food bowl is removed 327, and the reusable water bowl with the large water compartment is placed into the appliance. The owner re-zeros the water data by depressing the water button one time before filling with water.

In preparation for the subsequent pet next full meal, the owner removes the reusable water container from the appliance, removal thereby causing the end weight data to be recorded for the pet's record 328.

The wireless food serving appliance then communicates directly or indirectly all of the passively and actively collected food and water data to a network server for the daily run time schedule 322.

Further, all food and water consumption data collected from sources other than the wireless food serving appliance are communicated to the network server to be added to the pet's pet's personalized log 316.

The pet's nutrition and health records may then be accessed by a pet owner or veterinarian 317, preferably via push notifications to a wireless device, or via a WEB portal.

An analytics engine on the network server analyzed daily pet intake data, performs a comparative analysis of the current data to both historical data, and more importantly future predicted data, and automatically makes any food portion or nutrition adjustments to the pet's daily portions 318, and communicates that information back to the server accessible to a food manufacturer. The food manufacturer will appropriately modify the portion details for the next scheduled production of a multi-portion bulk food package 323.

FIG. 12 is an exemplary diagram illustrating a chart of one set of processes and triggered mathematical computations representative of software algorithms used to manage a pet's nutrition and health.

In the drawing, certain symbols are used to represent various measured components as described in the following list:

a) (Tf)=tare weight of a reusable food serving container b) (Gf)=the weight of a known food at the time the appliance recognizes that the correct portion weight for a specific pet has been filled into the food serving container c) (NfW)=net measurement of the water content of the food d) (NfS)=net measurement of the solid portion of the food Other symbols containing (NW) and (Subtotal Water) with a suffix refer to Net Weight, or Subtotal Water measurements at different stages of the daily food and water consumption data consolidation.

So as not to be overly burdensome defining every line item data point and describe it's contribution to the daily analysis of a pet's food and water consumption, those skilled in the art will understand the progression of solving various formulae to determine values for certain formula variables.

As previously discussed, it is important to establish the available water volume presented to a pet at the start of a recording period, the water comprising clear water and the moisture content of the food. In a variation of the pre-meal algorithm 404, the tare weight of the food container and the known amount of food portion are used as the first two measure constants. Weight measurements are made periodically with multiple occurrences of adding water, the formula resulting in an in-meal algorithm 405 that computes the total water consumed while the food and water container are docked in the wireless food serving appliance.

Since water must be made available to the pet throughout the day and fully between sequential mealtimes, a post meal water container 406 is placed into the wireless serving appliance, the container comprising an RFID chip with tare weight data that is read by the chip reader on the appliance. Water is then added one or more times throughout the measurement period, the formulae shown being used to compute the cumulative water consumption from the large water container. The post meal water algorithm 407 results in a constant water consumption value that is communicated to the network server.

It is also important to consolidate water consumption values from other metered and unmetered water sources 408 as previously described.

Finally, a total daily water algorithm 409 is used to determine the total water consumed by each pet, subsequently recording the total cumulative water consumption in the pet's profile log.

Unless otherwise defined, all technical and scientific terms used herein have the same meaning as commonly understood by one of ordinary skill in the art to which this invention belongs. Although methods and materials similar to or equivalent to those described herein can be used in the practice or testing of the animal nutrition system and method, suitable methods and materials are described above. All publications, patent applications, patents, and other references mentioned herein are incorporated by reference in their entirety to the extent allowed by applicable law and regulations. The animal nutrition system and method may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A pet feeding system, comprising:
a food container storing a volume of pet food, wherein the food container includes a floor, a sidewall extending upwardly from the floor defining an interior of the food container;
a package identification chip attached to the food container; and
a food serving appliance configured to removably receive the food container;
wherein the food serving appliance includes a recessed portion that removably receives the food container;
wherein the food serving appliance includes a single scale positioned to weigh the food container periodically to generate weight data;
wherein the food serving appliance includes a chip reader that communicates with the package identification chip to receive food container data from the package identification chip, wherein the food container data is combined with the weight data to determine the nutritional consumption of a pet.

2. The pet feeding system of claim 1, wherein the food container includes a food compartment and a water compartment.

3. The pet feeding system of claim 2, wherein the water compartment is initially empty and filled by an owner of the pet.

4. The pet feeding system of claim 2, wherein the water compartment is smaller than the food compartment.

5. The pet feeding system of claim 1, wherein the volume of pet food is comprised of kibble.

6. The pet feeding system of claim 1, wherein the food container is disposable.

7. The pet feeding system of claim 1, wherein the food container is rectangular shaped.

8. The pet feeding system of claim 1, wherein the food container includes a sealed food container closure to seal the interior of the food container, wherein the sealed food container closure is configured to be removed from the food container to expose the interior of the food container and allow consumption of the pet food.

9. The pet feeding system of claim 1, wherein the single scale is positioned within the recessed portion of the food serving appliance and supports the food container positioned within the food serving appliance.

10. The pet feeding system of claim 1, wherein the food container data includes an initial weight of the food container with the pet food without water added.

11. The pet feeding system of claim 10, wherein the food container data includes identification of the pet food within the food container.

12. The pet feeding system of claim 10, wherein the food container data includes nutritional information about the pet food.

13. The pet feeding system of claim 1, wherein the food container data includes a weight of the food container without the pet food and a weight of the pet food.

14. The pet feeding system of claim 13, wherein the food container data includes a weight of the pet food.

15. The pet feeding system of claim 13, wherein the scale measures an initial measured weight of the food container with the pet food and a volume of water added to the food container, wherein the food serving appliance records how much water is consumed by the pet by subtracting from the initial total weight a final measured weight and the weight of the food container without pet food.

16. The pet feeding system of claim 15, wherein the food serving appliance determines if the daily water consumption of the pet is outside an expected consumption range and if the daily water consumption of the pet is outside the expected consumption range the food serving appliance notifies the pet owner.

17. The pet feeding system of claim 1, including a water container having a recessed portion, wherein the recessed portion of the water container removably receives the food container.

18. The pet feeding system of claim 17, wherein the water container includes an identification chip that includes a weight of the water container without water, wherein the identification chip of the water container communicates with the chip reader of the food serving appliance.

19. The pet feeding system of claim 17, wherein the food container data includes a weight of the food container without the pet food and a weight of the pet food and wherein the scale measures an initial measured weight of the food container with the pet food, the water container without water and a volume of water added to the food container, wherein the food serving appliance records how much water is consumed by the pet by subtracting from the initial total weight a final measured weight, the weight of the water container and the weight of the food container without pet food.

20. The pet feeding system of claim 17, wherein the food container is positioned within the recessed portion of the water container and positioned within a package.

* * * * *